(12) United States Patent
Venkateswaran et al.

(10) Patent No.: US 8,265,050 B2
(45) Date of Patent: Sep. 11, 2012

(54) SYSTEM AND METHOD FOR SHARING A PAYLOAD AMONG MOBILE DEVICES IN A WIRELESS NETWORK

(75) Inventors: Vijay Venkateswaran, Fairfax, VA (US); Howard Pfeffer, Reston, VA (US); Kenneth Gould, Oakton, VA (US)

(73) Assignee: Time Warner Cable, Inc., New York, NY (US)

( * ) Notice: Subject to any disclaimer, the term of this patent is extended or adjusted under 35 U.S.C. 154(b) by 621 days.

(21) Appl. No.: 12/537,527

(22) Filed: Aug. 7, 2009

(65) Prior Publication Data

US 2011/0032914 A1 Feb. 10, 2011

(51) Int. Cl.
*H04W 4/00* (2009.01)
(52) U.S. Cl. .......................................... 370/338; 709/231
(58) Field of Classification Search .................. 370/338; 709/231
See application file for complete search history.

(56) References Cited

U.S. PATENT DOCUMENTS

| | | | | |
|---|---|---|---|---|
| 5,758,085 A * | 5/1998 | Kouoheris et al. | ............ | 709/231 |
| 6,490,264 B1 * | 12/2002 | Suzuki | ............ | 370/338 |
| 7,190,683 B2 | 3/2007 | Giallorenzi et al. | | |
| 7,457,319 B2 * | 11/2008 | Madapushi et al. | .......... | 370/476 |
| 2003/0046369 A1 | 3/2003 | Sim et al. | ...................... | 709/220 |
| 2004/0203881 A1 * | 10/2004 | Echols, Jr. | ................ | 455/456.1 |
| 2007/0217424 A1 * | 9/2007 | Kim et al. | ..................... | 370/392 |
| 2007/0286211 A1 * | 12/2007 | Toyomura et al. | ....... | 370/395.64 |
| 2009/0080406 A1 * | 3/2009 | Gopal et al. | .................. | 370/350 |
| 2009/0109945 A1 * | 4/2009 | Lakkis | .......................... | 370/338 |
| 2010/0287296 A1 * | 11/2010 | Riggert et al. | ................ | 709/231 |
| 2011/0032937 A1 * | 2/2011 | Gould et al. | .................. | 370/392 |

OTHER PUBLICATIONS

"NullRiver's iPhone App—NetShare Briefly Brought 3G/Edge Tethering for iPhone." Article on www.iphonehacks.com, Aug. 1, 2008. http://www.iphonehacks.com/2008/08/iphone-netshare.html.
General product information page of Cradlepoint Technology, © 2009, printed from Internet Nov. 4, 2009. http://www.cradlepoint.com. Product information page for Cradlepoint MBR900 router, © 2009, printed from Internet Nov. 4, 2009. http://www.cradlepoint.com/products/mbr900-our-most-affordable-3g4g-ready-mobile-broadband-n-router.
Product information on Smartphone Software Solutions by TapRoot Systems, Inc., printed from TapRoot Systems website on Nov. 4, 2009, http://www.taprootsystems.com/. Individual product information: WalkingHotSpot, http://www.taprootsystems.com/products_WHS_sw.html, http://www.walkinghotspot.com. Telephony Software Products, http://www.taprootsystems.com/products_telephony_sw.html.

* cited by examiner

*Primary Examiner* — Kenny Lin
(74) *Attorney, Agent, or Firm* — The Marbury Law Group, PLLC

(57) ABSTRACT

Systems and methods for sharing a payload among mobile devices in a wireless network. A first mobile device is configured to communicate with an access device via a first wireless path and with a media gateway server via a second wireless path. One or more other mobile devices are configured to communicate with the media gateway server via the second wireless path and with the first mobile device via a third wireless path. A payload is received at the first mobile device from the access device via the first wireless path and is partitioned into portions. One portion is assigned to the first mobile device, and the remaining portions are assigned to each of the one or more other mobile devices. The assigned payload portions are sent to the media gateway server via the second wireless path. The assigned payload portions are received at the media gateway server, and the payload is reconstructed from the received payload portions. The payload is sent to a destination address via a network. Payloads may also be received at the media gateway server, portioned, distributed to the first mobile device, reconstructed and delivered to the access device in a similar manner.

32 Claims, 10 Drawing Sheets

SYSTEM AND METHOD FOR SHARING A PAYLOAD AMONG MOBILE DEVICES IN A WIRELESS NETWORK

BACKGROUND

Wireless telephony continues to evolve, both in terms of the features of the mobile devices that connect to the wireless networks and the speed of the networks. Mobile devices such as mobile phones, PDAs, and "smartphones" are gaining greater functionality and in turn increasing their utility value beyond basic voice communications and SMS texting/messaging.

Mobile phones, for instance, often include a camera, a keypad for entering text and other commands, an operating system, user interfaces and software applications for surfing the Web and for sending and receiving email and text messages, and radio transceivers for providing wireless wide area mobile data, GPS, Bluetooth and Wi-Fi connectivity among others. These mobile devices, sometimes referred to as "smartphones," can also function as wireless cellular data access modems. Users are able to set their smart phones to act as cellular data access modems via Menu Settings on the handset which interface with the device software stack and device hardware to change the smartphone from communications device to access device. Ironically, when the smartphone is set as an access device, the voice communications and other networking functions of the handset are often disabled.

Current implementations involve tethering the smartphone via USB or BlueTooth to the Laptop. This limits the smartphone to act as a wireless data access modem for a single user laptop. However the new opportunities created by embedding WiFi radios in Smartphones will enable WiFi communications between the Smartphone and Laptop (given nearly 100% of laptops have WiFi chipsets embedded already). In addition to enabling WiFi communications between a smartphone and a hotspot, smartphones can also be used both as WiFi access points and as modems to provide Internet access to other devices.

Internet access via a mobile device is provided via a carrier's network. The technology used by the network will determine in large part the data rate the between the mobile device and the network to which it is connected. When another device (such as a computer, a laptop, a PDA or other mobile device) uses the mobile device to connect to the Internet, either as a modem (sometimes referred to as "tethering") or as a Wi-Fi access point, the connection between the other device and the mobile device will also affect the overall data throughput as experienced by the other device.

Mobile devices, such as smartphones, used as modems and mobile devices used as access points may be configured to provide connectivity simultaneously to a number of other devices. The number of such devices that may be connected at any one time to a mobile device used as an access point may be limited by the capabilities of the processor of the mobile device-access point, the power available to the mobile-device access point, and the speed of the connection between the mobile device-access point and the carrier network. Hence, the mobile device-access point becomes a bottleneck for communications generated by the access devices. In addition, a single device may make a data transfer (up or down stream) that can significantly impact the throughput of other access devices.

SUMMARY

Embodiments herein provide methods and devices that permit sharing of a payload among multiple mobile devices in a wireless network. Other embodiments herein provide methods and devices that permit sharing of a payload among multiple mobile devices in a wired network.

DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the various embodiments.

DETAILED DESCRIPTION

Various embodiments provide methods and devices that permit sharing of a payload among multiple mobile devices in a wireless network. Other embodiments herein provide methods and devices that permit sharing of a payload among multiple mobile devices in a wired network.

As used herein, the term "payload" encompasses a collection of related packets that may represent video content, audio content, photographic content, text content, game content, voice content and multi-media content.

As used herein, the term "access device" encompasses, for example, desktop computers, laptop computers and mobile devices and other processor-equipped devices that may be developed in the future that may be configured to permit a user to interact with other devices over a network.

As used herein, a "mobile device" encompasses a wireless device that may be configured to perform one or more functions that may include telephone communications, messaging, Internet connectivity, Wi-Fi connectivity, among others.

As used herein, a "server" is a computing device that may be configured to interact in an automated fashion with other devices over a network to serve content and web pages, to issue responses to communications from other network devices and to respond to queries from other network devices. As used herein, the term "server" refers to any computerized component, system or entity regardless of form which is adapted to provide data, files, applications, content, or other services to one or more other devices or entities on a computer network FIG. 1 is a system component diagram illustrating different components of a payload sharing system according to the various embodiments.

Figure 1:
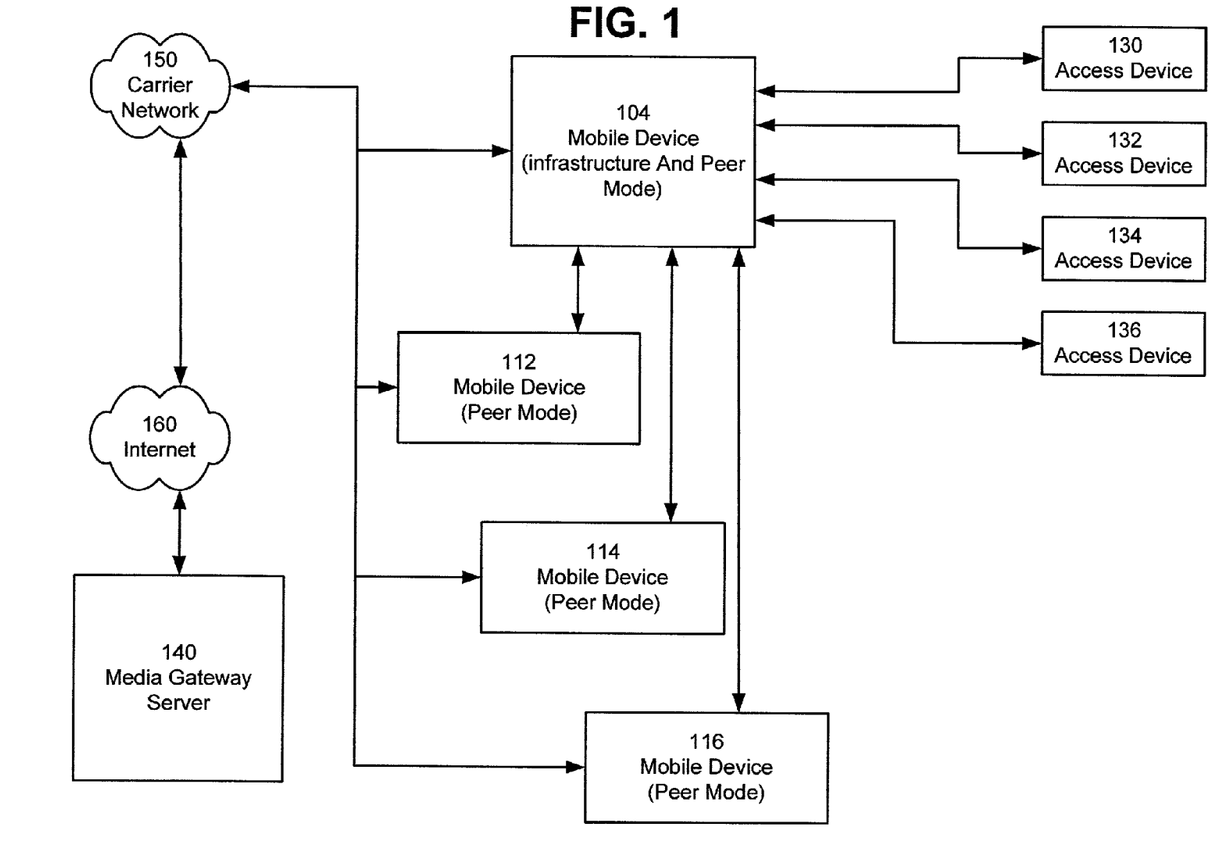
FIG. 1 is a system component diagram illustrating different components of a load sharing system according to the various embodiments.

As illustrated in FIG. 1, three mobile devices 112, 114 and 116 communicate with a fourth mobile device 104. While only four mobile devices are illustrated in FIG. 1, this is not meant as a limitation. Any number of mobile devices may be configured as illustrated in FIG. 1, subject only to limitations imposed by the systems used by the mobile devices to communicate in a network configuration.

Figure 7:
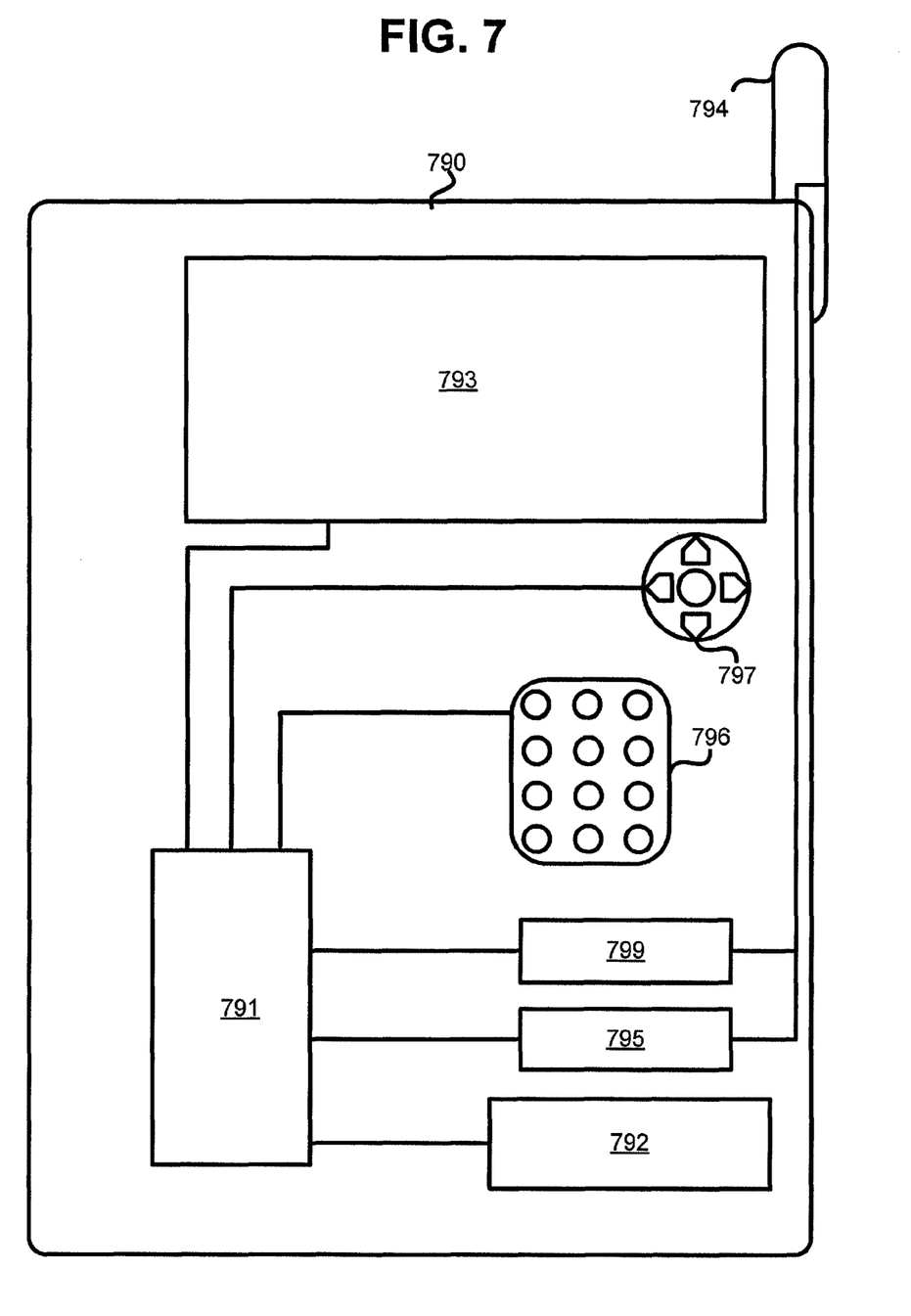
FIG. 7 is a component block diagram of a mobile device suitable for use in the various embodiments.

Typical mobile devices suitable for use with the various embodiments will have in common the components illustrated in FIG. 7. For example, the exemplary mobile device 790 may include a processor 791 coupled to internal memory 792, a display 793 and to a SIM 799 or similar removable memory unit. Additionally, the mobile device 790 may have an antenna 794 for sending and receiving electromagnetic radiation that is connected to a wireless data link 799 and/or cellular telephone transceiver 795 coupled to the processor 791. In some implementations, the transceiver 795 and portions of the processor 791 and memory 792 used for cellular telephone communications are collectively referred to as the air interface since it provides a data interface via a wireless data link. In other implementations, the cellular communications are provided via a baseband chipset that includes a baseband processor and the RFIC for accessing frequencies. In an embodiment, the wireless data link 799 may be provided by a Wi-Fi transceiver.

Mobile devices typically also include a key pad 796 or miniature keyboard and menu selection buttons or rocker switches 797 for receiving user inputs.

The processor 791 may be any programmable microprocessor, microcomputer or multiple processor chip or chips that can be configured by software instructions (applications) to perform a variety of functions, including the functions of the various embodiments described herein. In some mobile devices, multiple processors 791 may be provided, such as one processor dedicated to wireless communication functions and one processor dedicated to running other applications. Typically, software applications may be stored in the internal memory 792 before they are accessed and loaded into the processor 791. In some mobile devices, the processor 791 may include internal memory sufficient to store the application software instructions. In some mobile devices, additional memory chips (e.g., a Secure Data (SD) card) may be plugged into the device 790 and coupled to the processor 791. In many mobile devices, the internal memory 792 may be a volatile or nonvolatile memory, such as flash memory, or a mixture of both. For the purposes of this description, a general reference to memory refers to all memory accessible by the processor 791, including internal memory 792, removable memory plugged into the mobile device, and memory within the processor 791 itself, including the secure memory 798.

Referring again to FIG. 1, a Wi-Fi data link in the mobile device 104 is configured in both an "infrastructure mode" and an ad-hoc mode. The infrastructure mode permits the mobile device 104 to operate as an access point for the access devices 130, 132, 134 and 136. The access devices communicate with the mobile device 104 via a wired or wireless path. The mobile devices 112, 114 and 116 are configured to operate in an ad-hoc mode so as to allow each of these mobile devices to communicate with the mobile device 104. Each of the mobile devices is capable of communicating with a carrier network 150. In an embodiment, the carrier network 150 may offer a 3G service implementation. However, other service implementations may also be used, including without limitation, a 2.5G service, a 4G service and any other data service provides internet access to mobile devices.

The mobile device 104 may also be configured to operate as an access point for access devices such as the access devices 130, 132, 134 and 136. In an embodiment, an access device may be a computer, a laptop, a PDA, a mobile device and a video game console among other devices.

In an embodiment, the mobile devices 104, 112, 114 and 116 each comprise a transceiver (see, FIG. 7, 899) that enables both an ad hoc mode, wherein one of the mobile devices may communicate directly with another mobile device (sometimes referred to herein as "peers") and a infrastructure mode, wherein a mobile device performs the functions of an access point for devices (for example, access devices 130, 132, 134 and 136) seeking to communicate over an external network such as, for example, the internet 160. In an embodiment, the mobile devices 104, 112, 114 and 116 and the access devices 130, 132, 134 and 136 are configured as Wi-Fi devices that meet an IEEE 802.11 standard. However, this is not meant as a limitation. Other wireless protocols may be used to establish communications among the mobile devices 104, 112, 114 and 116 and the access devices 130, 132, 134 and 136.

The carrier network 150 provides access to the internet 160. A media gateway server 140 is connected to the Internet and may receive packets that are addressed to it. In an embodiment, only packets from registered sources will be accepted by the media gateway server 140.

Figure 2A:
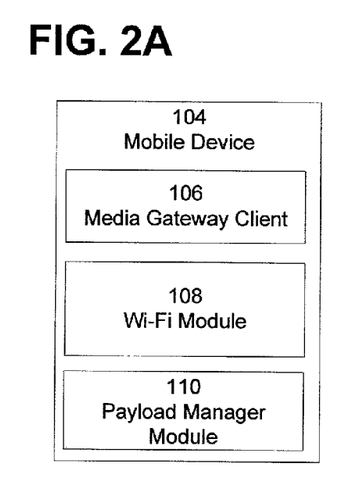
FIG. 2A is a component diagram illustrating different modules implemented on a mobile device configured as an access point according to an embodiment.

FIG. 2A illustrates additional components of the mobile device 104 that may be useful to provide certain of the functions described herein. A media gateway client 106 interfaces with the media gateway server 140. In an embodiment, the media gateway client 106 registers with the media gateway server 140.

As illustrated in FIG. 1, mobile device 104 is configured to operate as a peer for other mobile devices, including mobile devices 112, 114 and 116 and as an access point for access devices 130, 132, 134 and 136.

As illustrated in FIG. 2A, a Wi-Fi module 108 enables mobile devices to perform the functions of an access point and as a peering point. The Wi-Fi module 108 may further perform functions that permit the mobile devices 130, 132, 134 and 136 to register as peers with other mobile devices and to register other mobile devices as peers. A payload manager module 110 operates on both uploaded and downloaded payloads as will be discussed in detail below. The media gateway client 106, the Wi-Fi module 108 and payload manager module 110 may be implemented as software applications that are stored in a memory of the mobile device 104 and executed by a processor of mobile device 104.

Figure 2B:
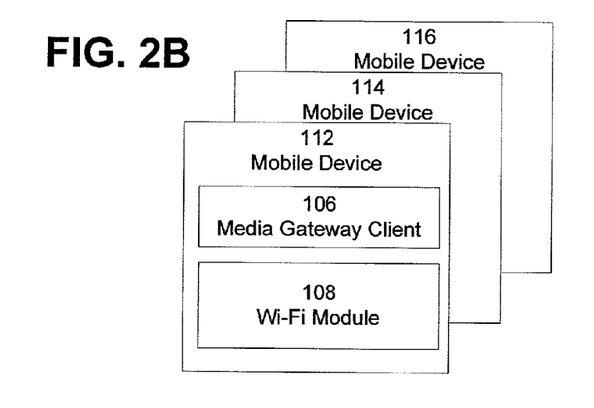
FIG. 2B is a component diagram illustrating different modules implemented on a mobile device configured as a peer of another mobile device according to an embodiment.

FIG. 2B illustrates additional components of the mobile devices 112, 114 and 116 that may be useful to provide certain of the functions described herein. A media gateway client 106 interfaces with the media gateway server 140. In an embodiment, the media gateway client 106 of each mobile device 104, 112, 114 and 116 registers with the media gateway server 140. The registration of the media gateway client 106 with the media gateway server 140 facilitates the routing of Internet traffic from the mobile devices 104, 112, 114 and 116 to the media gateway server 140.

The routing may be facilitated by headers inserted into packets by the media gateway client 106. By way of illustration and not by way of limitation, the payload manager 110 (located in AP mobile device 104) may insert a header comprising a first field comprising an IP address of media gateway server 140, a second field comprising an IP address of a destination device, and a third field comprising a payload portion. By way of illustration and not by way of limitation, the payload manager 142 (located in media gateway server 140; see FIG. 2C) may insert a header comprising a first field comprising an SSID IP address, a second field comprising an IP address of the media gateway server 140, a third field comprising an IP address of the access device requesting a download, and a fourth field comprising a payload portion. Other information useful for routing payload portions may be incorporated into packet headers using known methods and devices.

Additionally, the mobile devices 104, 112, 114 and 116 may form a peering "workgroup" among the multiple media gateway clients 106.

Handset users form a peering network or workgroup by registering and creating a peering/work group relationship among multiple Media Gateway Clients.

As illustrated in FIG. 1, the mobile devices 112, 114 and 116 are configured to communicate with the mobile device 104 as peers. A Wi-Fi module 108 enables the mobile devices 112, 114 and 116 to communicate with the mobile device 104. In an embodiment, each mobile device 112, 114 and 116 registers as a peer with the mobile device 104.

The media gateway client 106 and the Wi-Fi module 108 may be implemented as software applications that are stored in a memory of the mobile device 104 and executed by a processor of mobile device 104.

Figure 2C:
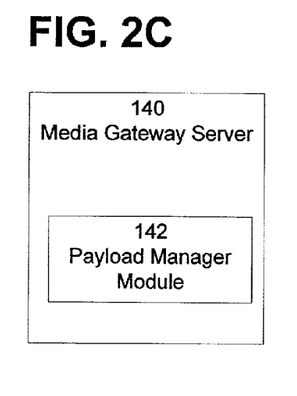
FIG. 2C is a component diagram illustrating a payload manager module implemented on a media gateway server according to an embodiment.

FIG. 2C illustrates the media gateway server 140 comprising a payload manager module 142. In an embodiment, the media gateway server 140 is hosted by the operator of carrier network 150. In another embodiment, the media gateway server 140 is hosted by a party unrelated to the operator of carrier network 150. By way of illustration and not by way of limitation, the media gateway server may be operated by the operator on whose network the mobile devices operate 104, 112, 114 and 116 and access devices 130, 132, 134 and 136, by an Internet Service Provider (ISP), or another party. The media gateway server 140 communicates with the mobile devices 104, 112, 114 and 116 via the media gateway clients 106 installed on those devices to transport packets to and from the mobile devices 104, 112, 114 and 116. The media gateway 140 may also maintain one or more registered workgroups of mobile devices operating registered media gateway clients 106.

The payload manager module 142 operates on both uploaded and downloaded payloads as will be discussed in detail below.

Figure 3A:
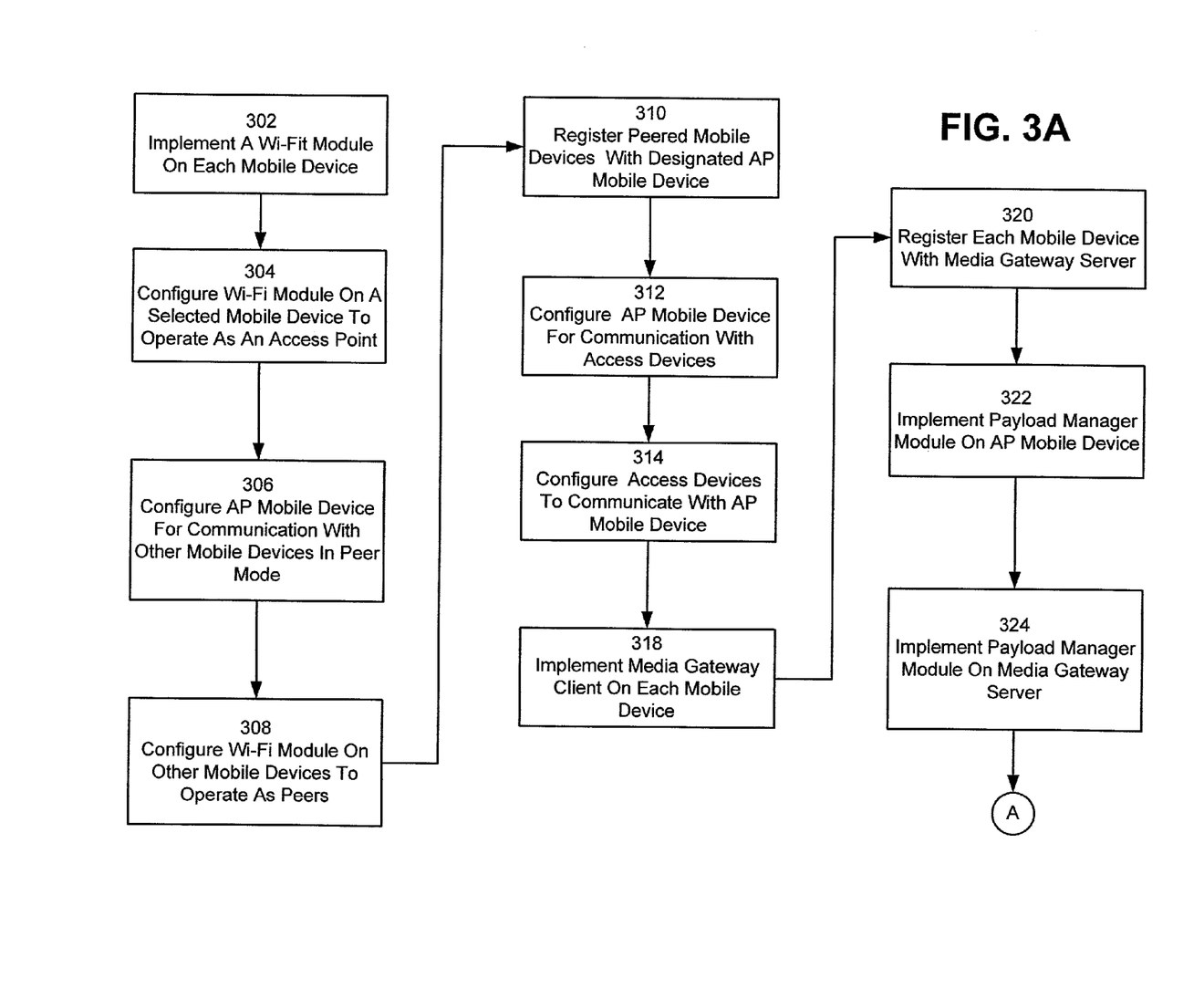
FIGS. 3A and 3B are process flow diagrams illustrating the configuration and operation of a payload sharing system according to an embodiment.

FIGS. 3A and B illustrate a process for configuring a payload sharing system as illustrated in FIGS. 1 and 2 according to an embodiment.

Referring to FIG. 3A, a Wi-Fi module 108 is implemented on each mobile device 104, 112, 114 and 116 (block 302). A mobile device 104 is selected to operate as a Wi-Fi access point (herein, the "AP mobile device") (block 304).

The Wi-Fi module 108 of AP mobile device 104 is configured to communicate with each mobile device 112, 114 and 116 in ad hoc mode (block 306) (mobile devices 112, 114 and 116 sometimes referred to herein as the "peered mobile devices").

The Wi-Fi module 108 of each peered mobile device 112, 114 and 116 is configured to communicate with the AP mobile device 104 in ad hoc mode (block 308).

The peered mobile devices 112, 114 and 116 register with the AP mobile device 104 as peers (block 310).

The Wi-Fi module 108 of the AP mobile device 104 is configured to communicate with the access devices 130, 132, 134 and 136 in infrastructure mode (block 312).

Each access device 130, 132, 134 and 136 is configured to communicate with the AP mobile device 104 via the Wi-Fi infrastructure mode (block 314).

A media gateway client 106 is implemented on each mobile device 104, 112, 114 and 116 (block 318). Each mobile device 104, 112, 114 and 116 registers with a media gateway server 140 (block 320).

A payload manager module 110 is implemented on the AP mobile device 104 (block 322). A payload manager module 142 is implemented on the media gateway server 140 (block 324).

Figure 3B:
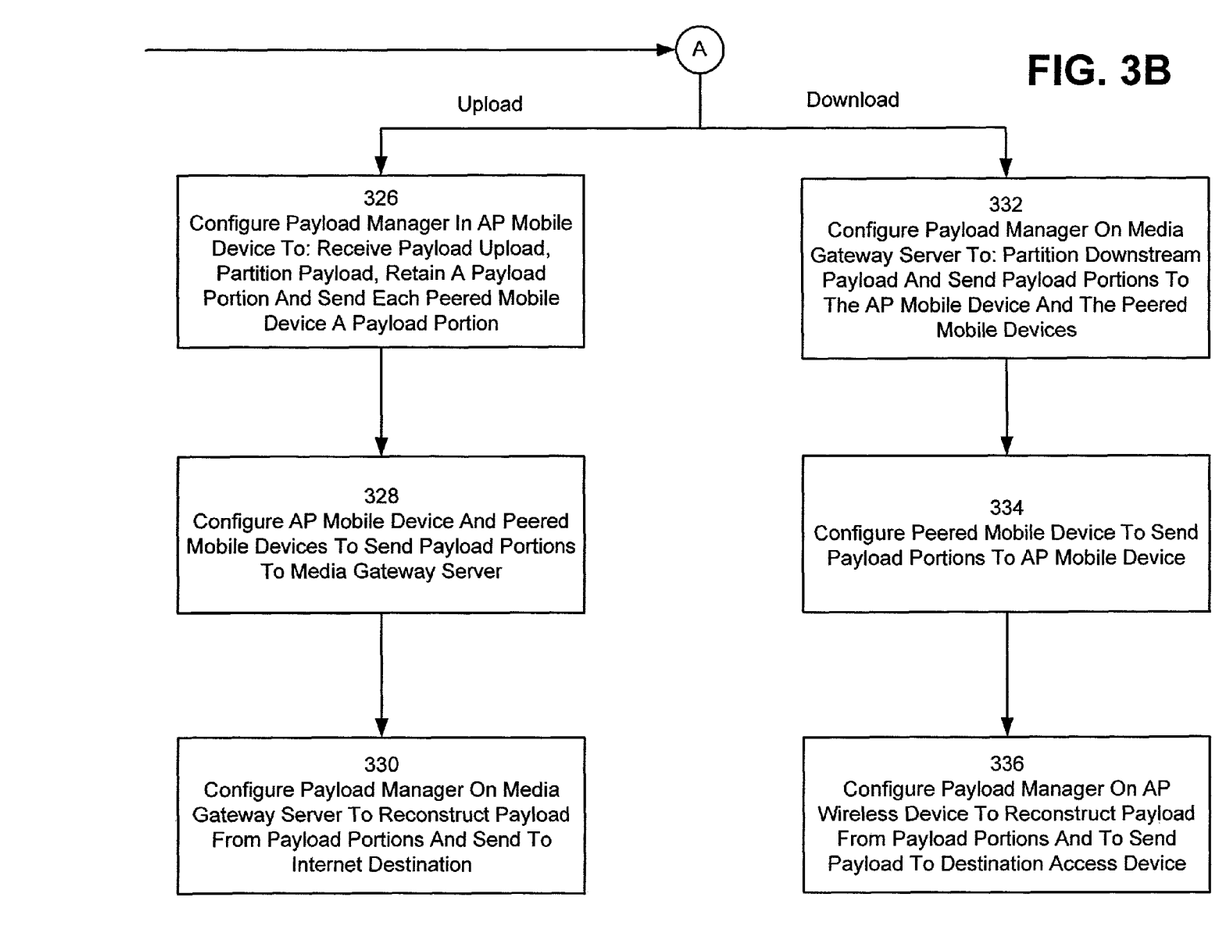

Referring to FIG. 3B, the payload manager module 110 implemented on AP mobile device 104 is configured to operate with the media gateway client 106 to obtain information on available mobile devices that are part of a particular workgroup, to receive a packet payload upload (upstream) from the access devices 130, 132, 134 and 136, to partition the payload into "payload portions," to retain one payload portion at the AP mobile device 104 and to send the payload portions to the peered mobile devices 112, 114 and 116 (block 326) that belong to a particular workgroup. The peered mobile devices 112, 114 and 116 and the AP mobile device 104 are configured to send their respective payload portions to the media gateway server 140 (block 328).

The payload manager module 142 implemented on the media gateway server 140 is configured to receive all of the payload portions, to reconstruct the payload from the payload portions, and to send the payload to its destination (block 330).

The payload manager module 142 implemented on the media gateway server 140 is configured to receive a payload download from the Internet destined for an access device 130, 132, 134 or 136, to partition the payload into "payload portions," and to send the payload portions to the AP mobile device 104 and the peered mobile devices 112, 114 and 116 (block 332). The peered mobile devices are configured to send their respective payload portions to the AP mobile device 104 (block 334). The payload module 110 implemented on AP mobile device 104 is configured to receive the payload portions from the AP mobile device 104 and the peered mobile devices 112, 114 and 116, to reconstruct the payload from the payload portions, and to send the payload to destination access device (block 336).

Figure 4:
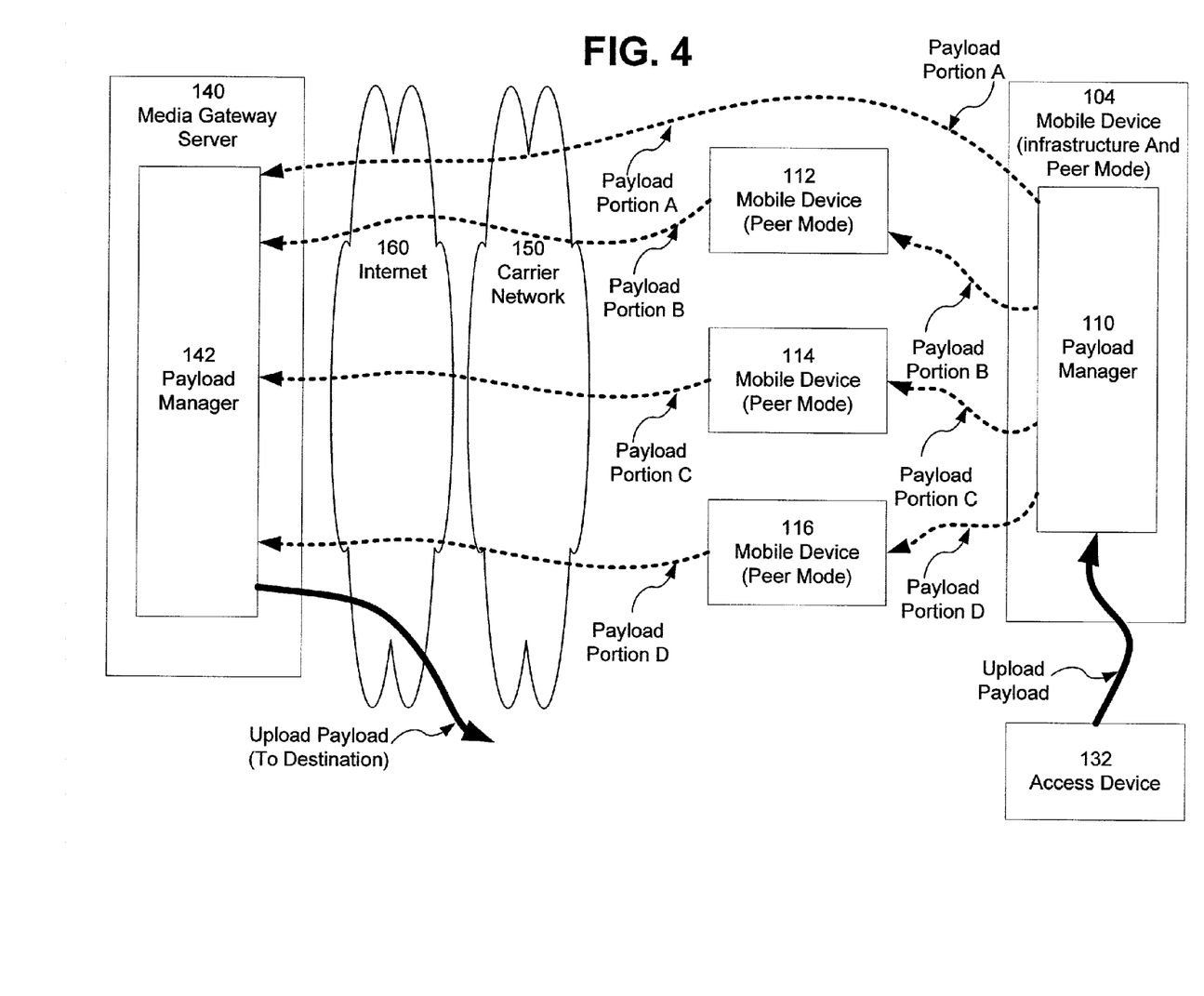
FIG. 4 is a process flow diagram illustrating the uploading of a payload according to an embodiment.

FIG. 4 is a process flow diagram illustrating the uploading of a payload according to an embodiment. In this embodiment, an access device 132 desires to send a payload to a device (not illustrated) with an Internet protocol (IP) address. The payload is delivered from the access device 132 to the AP mobile device 104 via a Wi-Fi connection.

The payload is processed by a payload manager module 110 to partition the payload into portions. As illustrated in FIG. 4, the payload has been partitioned into four portions (payload portions A, B, C and D, respectively); however, this is not meant as a limitation. In an embodiment, the payload manager module 110 on the AP mobile device 104 communicates via the media gateway client 106 to the media gateway server 140 to determine the number of "active" peered mobile devices. In this context, an active peered mobile device is a peered mobile device that is: 1) switched on; 2) has its WI-FI radio switched on; 3) and has an established connection to the cellular network. Based on the number of "active" peered mobile devices, the payload manager 110 will divide the payload by the number of active peered mobile devices (which includes the AP mobile device 104). In the embodiment illustrated in FIG. 1, the number of active peered mobile devices is four. In this embodiment, the payload manager 110 would divide the payload into four portions, retain one portion at the AP mobile device 104 and send a portion to each of the peered mobile devices 112, 114 and 116.

The respective payload portions B, C and D are sent from AP mobile device 104 to the peered mobile devices 112, 114 and 116. AP mobile device 104 and each peered mobile device 112, 114 and 116 accesses the Internet 160 via carrier network 150. AP mobile device 104 and each peered mobile device 112, 114 and 116 comprises a media gateway client 106 that permits those devices to communicate with the media gateway server 140. The respective payload portions A, B, C and D are routed to the media gateway server 140 and processed by payload manager module 142 implemented on the media gateway server 140. The payload manager 142 is configured to receive all of the payload portions, to reconstruct the payload from the payload portions, and to send the payload to its destination (not illustrated).

Figure 5:
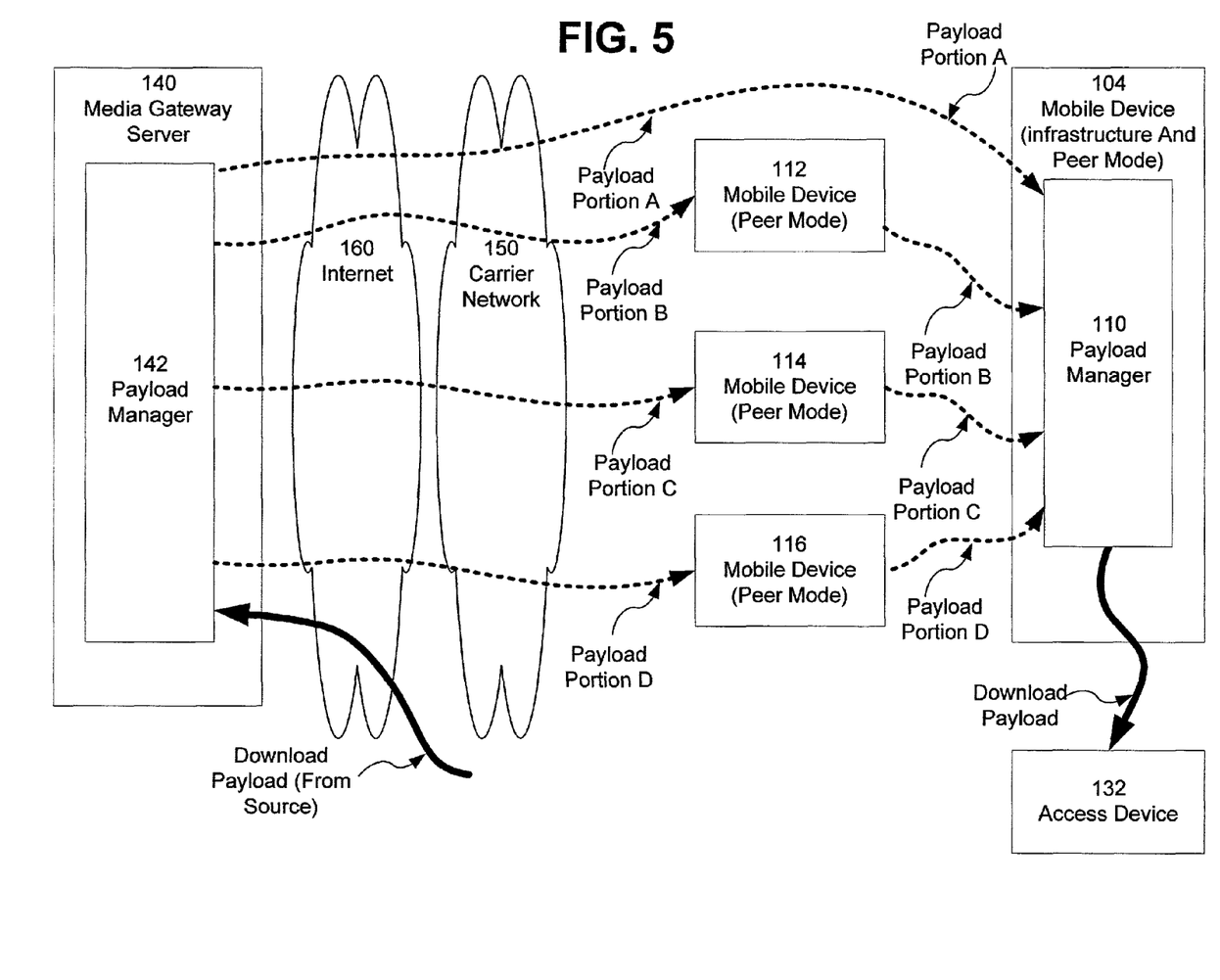
FIG. 5 is a process flow diagram illustrating the downloading of a payload according to an embodiment.

FIG. 5 is a process flow diagram illustrating the downloading of a payload according to an embodiment. In this embodiment, an access device 132 has requested a payload from a device (not illustrated) with an Internet protocol (IP) address. In this embodiment, all download requests are routed through the media gateway server 140 and all responses are returned to the media gateway server 140. The media gateway server 140 then decides whether partitioning of the payload is required and, if so, requests that a payload manager module 142 perform this task.

The payload is processed by the payload manager module 142 implemented on the media gateway server 140 to partition the payload into portions. As illustrated in FIG. 5, the payload has been partitioned into four portions (payload portions A, B, C and D respectively); however, this is not meant as a limitation. In an embodiment, the payload manager module 142 on the media gateway server 140 determines the number of "active" peered mobile devices. In this context, an active peered mobile device is a peered mobile device that is: 1) switched on; 2) has its WI-FI radio switched on; 3) and has an established connection to the cellular network. Based on the number of "active" peered mobile devices, the payload manager 142 will divide the payload by the number of active peered mobile devices (which includes the AP mobile device 104). In the embodiment illustrated in FIG. 1, the number of active peered mobile devices is four. In this embodiment, the payload manager 142 would divide the payload into four portions, send one portion to the AP mobile device 104 and send a portion to each of the peered mobile devices 112, 114 and 116.

The respective payload portions are sent from the media gateway server 140 to the AP mobile device 104 and the peered mobile devices 112, 114 and 116. The AP mobile device 104 and the peered mobile devices 112, 114 and 116 access the Internet 160 via carrier network 150. The AP mobile device 104 and the peered mobile devices 112, 114 and 116 each comprises a media gateway client 106 that permits those devices to communicate with the media gateway server 140. The respective payload portions A, B, C and D are routed to the AP mobile device 104 and processed by payload manager module 110 implemented on the AP mobile device 104. The payload manager 110 is configured to receive all of the payload portions, to reconstruct the payload from the payload portions, and to send the payload to its destination access device 132.

Figure 9:
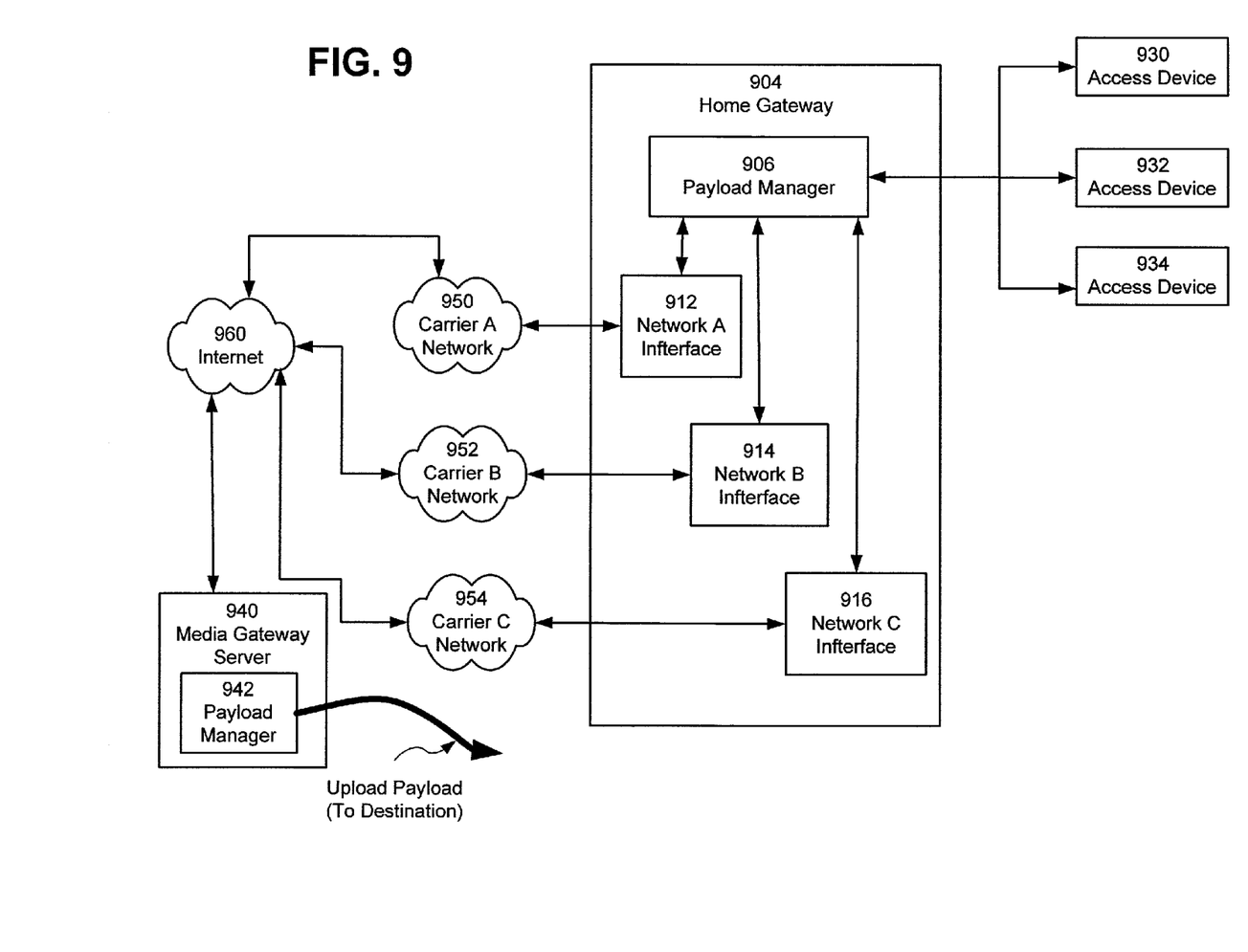
FIG. 9 is a system component diagram illustrating different components of an alternative load sharing system according to the various embodiments.

In an embodiment, a payload is shared among multiple mobile devices in a wireless network. FIG. 9 is a system component diagram illustrating different components of a load sharing system implemented in a wired network environment. A home gateway 904 comprises a payload manager 906 and network interfaces A, B and C (elements 912, 914 and 916, respectively). The home gateway 904 is accessible to an access device 930, an access device 932 and an access device 934. Then network interfaces 912, 914 and 916 each connect to a carrier network that accesses the Internet 960. As illustrated in FIG. 9, the network interface A 912 connects to carrier network A 950, the network interface B 914 connects to carrier network B 952, and the network interface C 916 connects to carrier network C 954. By way of illustration and not as a limitation, a carrier network may be a DSL, a cable network and a wireless network. An access device (for example, the access device 930) sends a payload to the home gateway 904. The payload manager 906 divides a payload into portions and sends a payload portion over the carrier networks 950, 952 and 954 via their respective network interfaces 912, 914 and 916 to the Internet 960. The payload portions are addressed to a media gateway server 940. The media gateway server 940 comprises a payload manager 942. The payload manager 942 receives the payload portions and reassembles the payload for delivery to its ultimate destination.

Downloads are processed in the reverse direction. That is, the payload manager 942 is responsible for receiving the payload, partitioning it and sending payload portions over the carrier networks to the payload manager 906 in the home gateway 904. The payload portions travel in parallel over the various high-speed networks.

Figure 6:
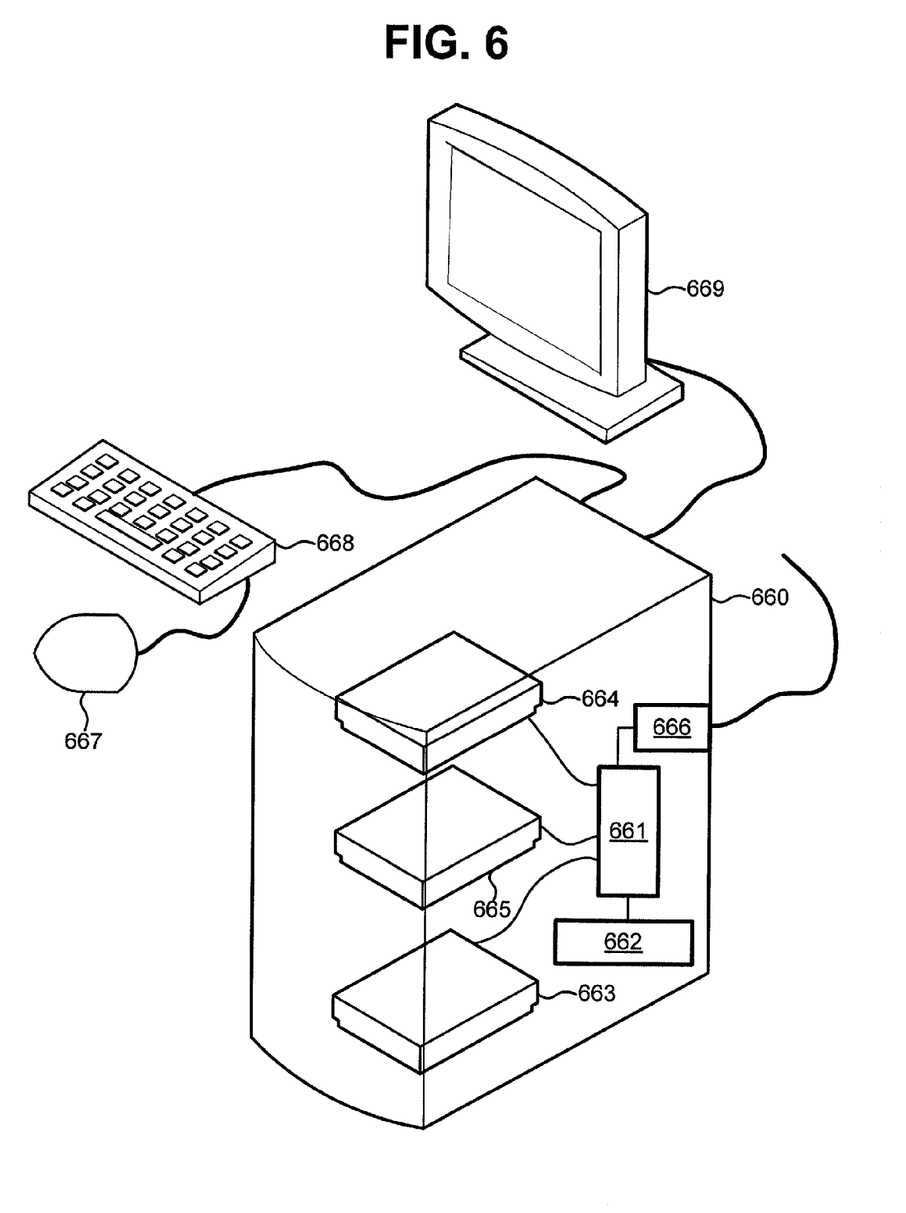
FIG. 6 is a component block diagram of a personal computer suitable for use in the various embodiments.

As previously described, the AP mobile device 104 may interact with a variety of access devices, including a personal computer. By way of illustration, the functional components of a personal computer 660 are illustrated in FIG. 6. Such a personal computer 660 typically includes a processor 661 coupled to volatile memory 662 and a large capacity nonvolatile memory, such as a disk drive 663. The computer 660 may also include a floppy disc drive 664 and a compact disc (CD) drive 665 coupled to the processor 661. Typically the computer device 660 will also include a pointing device such as a mouse 667, a user input device such as a keyboard 668 and a display 669. The computer device 660 may also include a number of connector ports coupled to the processor 661 for establishing data connections or receiving external memory devices, such as a USB or FireWire® connector sockets or other network connection circuits 666 for coupling the processor 661 to a network. In a notebook configuration, the computer housing includes the pointing device 667, keyboard 668 and the display 669 as is well known in the computer arts.

Figure 8:
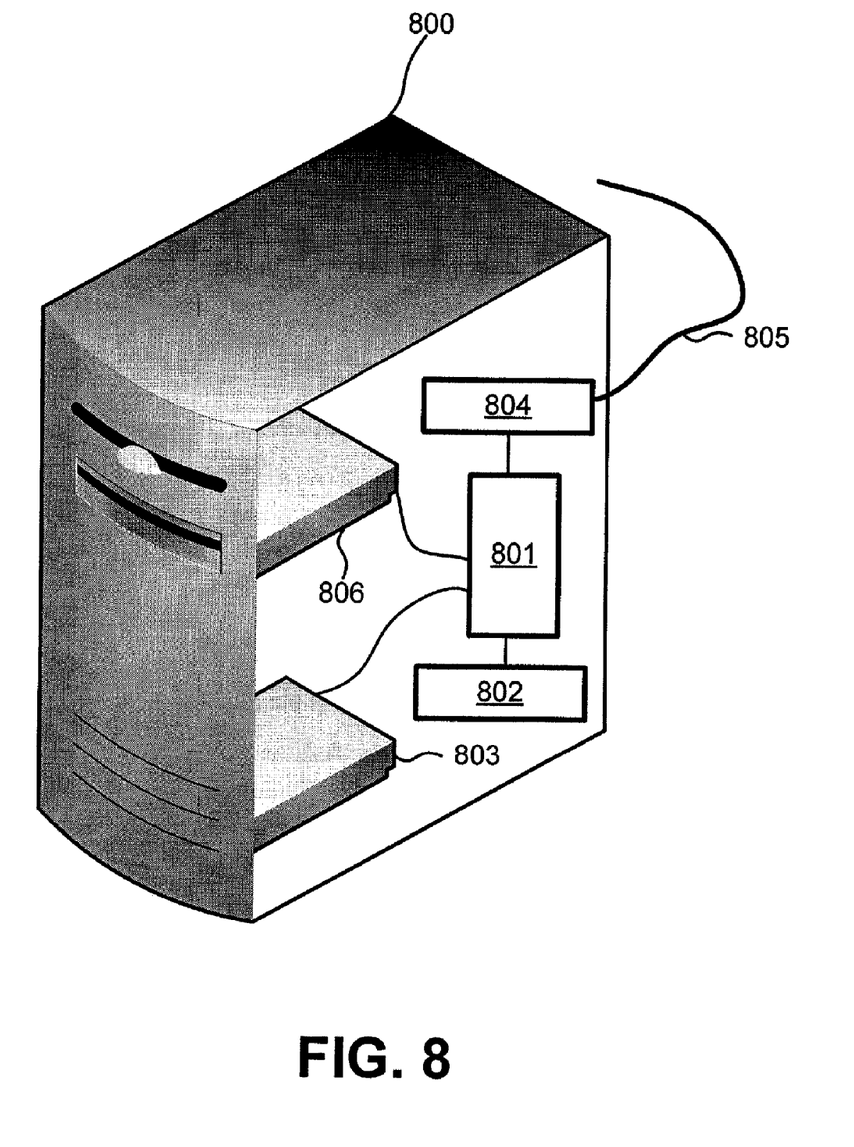
FIG. 8 is a component block diagram of a server device suitable for use in the various embodiments.

A number of the aspects described above may also be implemented with any of a variety of remote server devices, such as the server 800 illustrated in FIG. 8. Such a server 800 typically includes a processor 801 coupled to volatile memory 802 and a large capacity nonvolatile memory, such as a disk drive 803. The server 800 may also include a floppy disk drive (not illustrated) and/or a compact disc (CD) drive 806 coupled to the processor 801. The server 800 may also include a number of connector ports 804 coupled to the processor 801 for establishing data connections with network circuits 805.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of the computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as cellular, infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein. Further, any reference to claim elements in the singular, for example, using the articles "a," "an," or "the," is not to be construed as limiting the element to the singular.

What is claimed is:

1. A method for sharing a payload among mobile devices in a wireless network comprising:
    configuring a first mobile device to communicate with an access device via a first wireless path and with a media gateway server via a second wireless path;
    configuring one or more other mobile devices to communicate with the media gateway server via the second wireless path and with the first mobile device via a third wireless path;
    receiving at the first mobile device a payload from the access device via the first wireless path, wherein the payload comprises data and a destination address;
    partitioning the payload into portions;
    assigning one portion to the first mobile device and assigning the remaining portions to each of the one or more other mobile devices;
    sending from the first mobile device and each of the one or more other devices the assigned payload portion to the media gateway server via the second wireless path;
    receiving the payload portions at the media gateway server;
    reconstructing the payload from the received payload portions; and
    sending the payload to the destination address via a network.

2. The method of claim 1, wherein the access device is selected from the group consisting of a computer, a laptop, a PDA, a mobile device and a video game console.

3. The method of claim 1, wherein the first mobile device and the one or more other mobile devices are selected from the group consisting of a mobile phone, a PDA, and a smartphone.

4. The method of claim 1, wherein the first wireless path comprises a Wi-Fi network configured in an infrastructure mode and the third wireless path comprises the Wi-Fi network configured in an ad hoc mode.

5. The method of claim 1, wherein the second wireless path is a high-speed wireless data network.

6. The method of claim 1, wherein the network is selected from the group consisting of a private network and the Internet.

7. The method of claim 1, wherein the payload is selected from the group consisting of a document, an image, a video, audio data, game data, and a software program.

8. The method of claim 1, wherein partitioning the payload into portions comprises:

executing a transmit/receive sequence for each of the one or more other mobile devices to determine a number of other mobile devices;

using a timing of receipt of an acknowledgement signal from each of the one or more other mobile devices to prioritize the distribution of the payload among the number of the one or more other mobile devices; and distributing of the payload among the number of the one or more other mobile devices according to the priority of distribution.

9. A method for sharing a payload among mobile devices in a wireless network comprising:

configuring a first mobile device to communicate with an access device via a first wireless path and with a media gateway server via a second wireless path;

configuring one or more other mobile devices to communicate with the media gateway server via the second wireless path and with the first mobile device via a third wireless path;

receiving at the first mobile device a request for a payload from the access device via the first wireless path, wherein the payload request comprises a request for data from a source having a source address;

sending the payload request to the media gateway server via the second wireless path;

sending the payload request from the media gateway server to the source address via a network;

receiving the payload at the media gateway server from the source; partitioning the payload into portions;

assigning one portion to the first mobile device and assigning the remaining portions to each of the one or more other mobile devices;

sending from the media gateway server the assigned payload portions to the first mobile device and each of the one or more other devices server via the second wireless path;

receiving the assigned payload portions at the first mobile device and each of the one or more mobile devices;

sending the assigned payload portions received at each of the one or more mobile devices to the first mobile device via the third wireless path;

reconstructing the payload from the payload portions received at the first mobile device;

and sending the payload to the access device via the first wireless path.

10. The method of claim 9, wherein the access device is selected from the group consisting of a computer, a laptop, a PDA, a mobile device and a video game console.

11. The method of claim 9, wherein the first mobile device and the one or more other mobile devices are selected from the group consisting of a mobile phone, a PDA, and a smartphone.

12. The method of claim 9, wherein the first wireless path comprises a Wi-Fi network configured in an infrastructure mode and the third wireless path comprises the Wi-Fi network configured in an ad hoc mode.

13. The method of claim 9, wherein the second wireless path is a high-speed wireless data network.

14. The method of claim 9, wherein the network is selected from the group consisting of a private network and the Internet.

15. The method of claim 9, wherein the payload is selected from the group consisting of a document, an image, a video, audio data, game data, and a software program.

16. The method of claim 9 further comprising communicating from the first mobile device to the media gateway server a number of the one or more other mobile devices and a priority of distribution among the number of the one or more other mobile devices wherein partitioning the payload into portions comprises distributing of the payload among the number of the one or more other mobile devices according to the priority of distribution.

17. A system for sharing a payload among mobile devices in a wireless network comprising:

a network;
an access device;
a first mobile device;
one or more other mobile devices; and
a media gateway server, wherein the access device is configured to:
communicate with the first mobile device via a first wireless path;
generate a payload, wherein the payload comprises data and a destination address; and
send the data to the first mobile device via the first wireless path; and wherein the first mobile device is configured to:
communicate with the access device via the first wireless path and with the media gateway server via a second wireless path;
communicate with the one or more other mobile devices via a third wireless path;
receive the payload from the access device via the first wireless path;
partition the payload into portions, assign one portion to the first mobile device and assign the remaining portions to the one or more other mobile devices;
send the payload portion assigned to the first mobile device to the media gateway server via the second wireless path; and
send each of the one or more other mobile devices a remaining payload portion via the third wireless path; and wherein each of the one or more other mobile devices is configured to:
communicate with the media gateway server via a second wireless path and communicate with the first mobile device via the third wireless path;
receive the assigned remaining payload portion;
send the assigned remaining payload portion to the media gateway server via the second wireless path; and wherein the media gateway server is configured to:
communicate with the first mobile device and the one or more other mobile devices via the third wireless path;
receive the payload portion assigned to the first mobile device and the remaining payload portions assigned to each of the one or more other mobile devices;
reassemble the payload from the payload portions; and
route the payload to the destination address via the network.

18. The system of claim 17, wherein the access device is selected from the group consisting of a computer, a laptop, a PDA, a mobile device and a video game console.

19. The system of claim 17, wherein the first mobile device and the one or more other mobile devices are selected from the group consisting of a mobile phone, a PDA, and a smartphone.

20. The system of claim 17, wherein the first wireless path comprises a Wi-Fi network configured in an infrastructure mode and the third wireless path comprises the Wi-Fi network configured in an ad hoc mode.

21. The system of claim 17, wherein the second wireless path is a high-speed wireless data network.

22. The system of claim 17, wherein the network is selected from the group consisting of a private network and the Internet.

23. The system of claim 17, wherein the payload is selected from the group consisting of a document, an image, a video, audio data, game data, and a software program.

24. The system of claim 17, wherein the first mobile device is further configured to:
- execute a transmit/receive sequence for each of the one or more other mobile devices to determine a number of the one or more other mobile devices;
- use a timing of receipt of an acknowledgement signal from each of the one or more other mobile devices to prioritize the distribution of the payload among the number of the one or more other mobile devices; and
- distribute the payload among the number of the one or more other mobile devices according to the priority of distribution.

25. A system for sharing a payload among mobile devices in a wireless network comprising:
- a network;
- an access device;
- a first mobile device;
- one or more other mobile devices; and
- a media gateway server,
  - wherein the access device is configured to:
    - communicate with the first mobile device via a first wireless path;
    - generate a request for a payload, wherein the payload request comprises a request for data from a source having a source address; and
    - send the payload request to the first mobile device via the first wireless path; and
  - wherein the first mobile device is configured to:
    - communicate with the access device via the first wireless path and with the media gateway server via a second wireless path;
    - communicate with the one or more other mobile devices via a third wireless path;
    - receive the payload request from the access device via the first wireless path;
    - send the payload request to the media gateway server via the second wireless path;
  - wherein the media gateway server is configured to:
    - communicate with the first mobile device and the one or more other mobile devices via the second wireless path;
    - receive the payload request from the first mobile device;
    - send the payload request to the source address via the network;
    - receive the payload at the media gateway server from the source via the network;
    - partition the payload into portions, assigning one portion to the first mobile device and assigning the remaining portions to each of the one or more other mobile devices;
    - send the assigned payload portions to the first mobile device and each of the one or more other devices server via the second wireless path;
  - wherein each of the one or more other mobile devices is configured to:
    - communicate with the media gateway server via a second wireless path and communicate with the first mobile device via the third wireless path;
    - receive the assigned remaining payload portion;
    - send the assigned remaining payload portion to the first mobile device via the third wireless path; and
  - wherein the first mobile device is further configured to:
    - receive the payload portion assigned to the first mobile device and the remaining payload portions assigned to each of the one or more other mobile devices;
    - reassemble the payload from the payload portions; and
    - send the payload to the access device via the first wireless path.

26. The system of claim 25, wherein the access device is selected from the group consisting of a computer, a laptop, a PDA, a mobile device and a video game console.

27. The system of claim 25, wherein the first mobile device and the one or more other mobile devices are selected from the group consisting of a mobile phone, a PDA, and a smartphone.

28. The system of claim 25, wherein the first wireless path comprises a Wi-Fi network configured in an infrastructure mode and the third wireless path comprises the Wi-Fi network configured in an ad hoc mode.

29. The system of claim 25, wherein the second wireless path is a high-speed wireless data network.

30. The system of claim 25, wherein the network is selected from the group consisting of a private network and the Internet.

31. The system of claim 25, wherein the payload is selected from the group consisting of a document, an image, a video, audio data, game data, and a software program.

32. The system of claim 25, wherein the first mobile device is further configured to:
- communicate from the first mobile device to the media gateway server a number of the one or more other mobile devices and a priority of distribution among the number of the one or more other mobile and devices, and wherein the media gateway server is further configured to distribute the payload among the number of the one or more other mobile devices according to the priority of distribution.

* * * * *